(12) United States Patent
Altwies

(10) Patent No.: US 8,651,283 B2
(45) Date of Patent: Feb. 18, 2014

(54) MESH SCREEN ASSEMBLY WITH REDUCED PULL-OUT

(75) Inventor: Eugene W. Altwies, Burlington, WI (US)

(73) Assignee: Illinois Tool Works Inc., Glenview, IL (US)

( * ) Notice: Subject to any disclaimer, the term of this patent is extended or adjusted under 35 U.S.C. 154(b) by 163 days.

(21) Appl. No.: 13/259,288

(22) PCT Filed: Feb. 22, 2010

(86) PCT No.: PCT/US2010/024874
§ 371 (c)(1),
(2), (4) Date: Sep. 23, 2011

(87) PCT Pub. No.: WO2010/110976
PCT Pub. Date: Sep. 30, 2010

(65) Prior Publication Data
US 2012/0012519 A1    Jan. 19, 2012

Related U.S. Application Data

(60) Provisional application No. 61/163,198, filed on Mar. 25, 2009.

(51) Int. Cl.
*B01D 33/23*    (2006.01)
*B01D 39/08*    (2006.01)
*B29C 45/14*    (2006.01)

(52) U.S. Cl.
USPC ........... 210/486; 210/330; 210/331; 210/489; 210/499; 210/493.1; 264/257

(58) Field of Classification Search
None
See application file for complete search history.

(56) References Cited

U.S. PATENT DOCUMENTS 5,055,192 A * 10/1991 Artinyan et al. ............... 210/346
2009/0020483 A1 * 1/2009 Davis et al. .................... 210/784

FOREIGN PATENT DOCUMENTS

WO    2009011862 A1    1/2009

OTHER PUBLICATIONS

ISR for PCT/US2010/024874 dated Apr. 22, 2010.

* cited by examiner

*Primary Examiner* — Benjamin Kurtz
(74) *Attorney, Agent, or Firm* — Mark W. Croll; Paul F. Donovan

(57) ABSTRACT

A mesh screen, for example for filtration wheels used in water treatment, provides a set of pleated filter elements assembled by in-molding the mesh into stringers subdividing a frame. Retention strips following the pleated edges of the filter elements at the stringers include apertures permitting direct clamping of the mesh near the stringers and the ability to visually inspect, after molding, engagement between the molded elements and the mesh while providing an increased engagement area between the mesh and elements of the overmolded frame.

16 Claims, 3 Drawing Sheets

MESH SCREEN ASSEMBLY WITH REDUCED PULL-OUT

CROSS REFERENCE TO RELATED APPLICATION

This Non-Provisional Application is national phase of PCT/US2010/024874 filed Feb. 22, 2010, and claims benefit to U.S. Provisional Application Ser. No. 61/163,198 filed Mar. 25, 2009.

FIELD OF THE INVENTION

The present invention relates to mesh screen assemblies and, more particularly, to mesh screen assemblies for use in, for example, wastewater treatment facilities.

BACKGROUND OF THE INVENTION

Referring to FIG. 1, screen assemblies 10 such as those used in wastewater treatment facilities, may provide panels that can be assembled together to form a windmill-like filter wheel 12. The filter wheel 12 may be partially submerged in wastewater so that some of the screen assemblies 10 extend into a flow of water 14 to provide a screening or filtering action. As the submerged screen assemblies 10 become dirty or clogged on account of their filtering nature, the filter wheel 12 is indexed 16 to move the dirty screen assemblies 10 out and clean screen assemblies 10 into the flow of water 14. The dirty screen assemblies 10 are cleaned for future use, for example, in place, after they have been rotated out of the water stream.

Each screen assembly 10 may, for example, include an outer frame 18 describing a planar isosceles trapezoid to approximate a sector of an annulus that forms the filter wheel 12. The frame 18 defines a filter area (typically exceeding 350 square inches) that is divided by a set of parallel stringers 20 into filter sections 21, each filter section holding a pleated mesh 22. The pleated meshes 22 in each filter section 21 are generally separate panels of woven mesh 23 that are joined together in the frame 18 by having their ends and edges in-molded into a thermoplastic material forming the frame 18 and stringers 20. The mesh 23 may, for example, provide a mesh size of approximately 11-30µ.

Generally, the width of the stringers 20, across which the adjacent pleated mesh 22 are joined, and as measured on an axis extending between the parallel sides of the frame 18 and perpendicular to the intended flow of water 14, is desirably minimized to maximize filter area and minimize flow resistance. Conversely the height of the stringers 20, along the direction of intended water flow, is sized to approximately equal the height of the pleats so as to fully capture and support the pleated ends of the pleated mesh 22.

In one prior art implementation, the pleated mesh 22 is of a woven mesh 23 and is pleated along parallel fold lines extending generally radially (with respect to the wheel 12 when the panel 10 is assembled into the wheel 10). The stringers 20, accordingly, extend generally perpendicular to fold lines 24 and parallel to tangents to the periphery of the wheel 12 when the panel 10 is assembled into the wheel 10.

Molded ridge bars 26 may follow the fold lines of the pleated mesh 22 adhered on both sides of the mesh 23 at ridges and valleys of the pleats to the pleated material to provide support for the pleats. During manufacture, the pleated mesh 22 is inserted into an injection mold, the latter providing cavities that form the frame 18, stringers 20, and ridge bars 26. Injection of thermoplastic into these cavities provides an in-molding of the pleated mesh 22 to assemble them into the panel 10.

A problem with this type of molding operation is that the mesh 23 may shift in the mold during the molding operation under the force of the flowing thermoplastic. This can be particularly a problem at the pleated ends of the pleated mesh 22 where they are inserted into the stringers 20. During use, screens that are poorly captured in the stringers can pull out 19 which, in turn, promote further ripping of the mesh 23 along the ridge bars 26.

Referring to FIG. 2a, this shifting may not always be easily detected particularly when the mesh 23 is partially embedded within the material of the stringer 20 over only a narrow edge region 28 less than half the width of the stringer 20. This is in contrast to the desired larger edge region 30 of the mesh 23 that should be embedded in the stringer 20 equal to substantially half the width of the stringer 20 as shown in FIG. 2b. This larger edge region 30 is necessary to provide good retention of the ends of the mesh 23.

Visual inspection may indicate no difference between the two assemblies of FIGS. 2a and 2b. The ability to ensure proper location of the woven mesh 23 during molding is particularly critical given the desirably narrow width of the stringers 20 for conservation of plastic.

SUMMARY OF THE INVENTION

The present invention provides an improved frame design for a panel mesh filter which attaches narrow retention strips to opposite sides of the stringers that extend outward over the mesh to provide improved engagement. These retention strips may follow the pleating of the mesh to provide for efficient use of plastic material and may include windows permitting high-pressure retention clamps to be employed in the mold to hold mesh 23 in place at the point of attachment. The windows further provide the ability for post-molding visual inspection that can verify the full capture of the woven mesh within the molded material.

Specifically the present invention provides a mesh screen assembly having a thermoplastic frame defining a filter area and at least two thermoplastic stringers extending across the filter area to divide the filter area into filter sections. At least two filter meshes extend within different filter sections between portions of the frame to approach opposite sides of at least one stringer, the filter meshes having opposed edges in-molded within at least one stringer. The stringers further include mesh retention strips extending outward from the stringers to cover opposing sides of edges of the filter meshes embedded in the stringer, the mesh retention strips including a window exposing a portion of an edge of a filter mesh indicating a depth of insertion of the filter mesh into the filter mesh retention strip.

It is therefore a feature of at least one embodiment of the invention to provide substantially improved retention of the ends of the screens embedded in narrow stringers by admitting high-pressure clamping elements to retain the screens in position. It is another feature of at least one embodiment of the invention to provide a simple means of post-molding visual inspection to ensure proper retention of the screen ends.

The filter meshes may be pleated along fold lines substantially perpendicular to the stringers.

It is therefore a feature of at least one embodiment of the invention to permit the retention and support the ends of pleats that substantially increased the filter area of the filter without unduly increasing the thickness of the stringer and the amount of thermoplastic necessary to retain the pleats.

The mesh screen assembly may further include thermoplastic ridge bars extending along the ridges of the pleats between the stringers to support the pleats.

It is therefore a feature of at least one embodiment of the invention to support the pleated mesh 23 against the force of flowing water with moldable features that may extend from the stringers.

The stringers may provide planar surfaces abutting edges of the pleats over the entire edge of the pleats.

It is therefore a feature of at least one embodiment of the invention to provide end support of the pleats to resist deformation with water flow.

The mesh screen assembly may further include ribs having ends attached to different adjacent ridge bars and positioned between the stringers, the ribs in-molding the filter mesh.

It is therefore a feature of at least one embodiment of the invention to provide additional support of the mesh 23 to reduce pullout tension on the filter ends at the stringers.

The mesh screen may be a woven mesh.

It is therefore a feature of at least one embodiment of the invention to provide a retention method for woven mesh of a type in which individual wires can slide within the weave and thus have a greater propensity for pull-out.

The mesh screen assembly may include at least two layers of woven mesh 23.

It is therefore a feature of at least one embodiment of the invention to provide a system that allows firm clamping of two layers of mesh 23 whose combined elasticity might otherwise resist capture by the clamping pressure of the mold halves themselves.

The mesh screen assembly of claim 1 wherein the frame is an isosceles trapezoid.

It is therefore a feature of at least one embodiment of the invention to provide a system that allows blind abutment of different filter elements within the frame assembly for more efficient use of mesh 23 in the trapezoidal filter.

The mesh screen assembly of claim 1 wherein the frame substantially conforms to a sector of annulus so that multiple frames may be fit together to form a filter wheel.

It is therefore a feature of at least one embodiment of the invention to provide a mesh screen assembly suitable for conventional filter wheels.

The invention also provides a method of fabrication of the above described mesh screen assembly comprising the steps of placing at least two filter meshes with in a mold having cavities describing a frame defining a filter area and at least two stringers extending across the filter area to divide the filter area into filter sections so that the two filter meshes extend within different filter sections between portions of the frame cavity and opposite sides of at least one stringer cavity, the filter meshes having opposed edges entering at least one stringer from opposite sides; the mold cavity describing the stringer providing for a molding of mesh retention strips extending outward from the stringers to cover opposing sides of edges of the filter meshes embedded in the stringer, the mesh retention strips including a window exposing a portion of an edge of a filter mesh indicating a depth of insertion of the filter mesh into the filter mesh retention strip. The filter meshes are then clamped by clamps independently movable with respect to the mold, engaging the filter meshes through the window portion of the stringer cavity, and thermoplastic is injected within the mold cavity to fill the frame and stringers thereby in-molding edges of the filter meshes.

It is therefore a feature of at least one embodiment of the invention to provide a system that may provide focused clamping of the mesh independent of the closure force of the mold.

Other features and advantages of the invention will become apparent to those skilled in the art upon review of the following detailed description, claims and drawings in which like numerals are used to designate like features.

Figure 1:
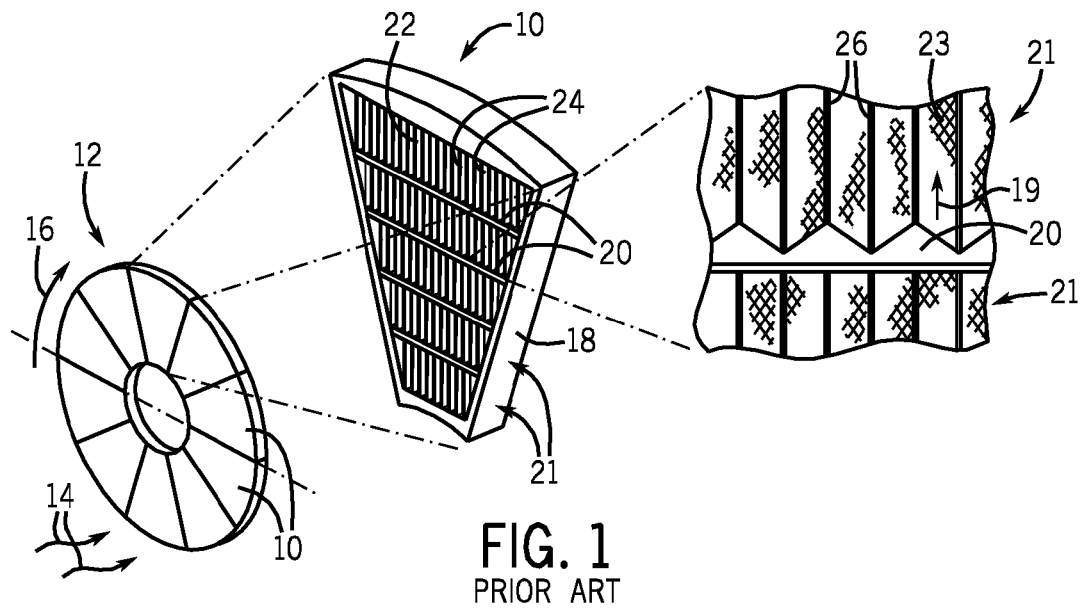
FIG. 1 is a perspective view of a prior art filter wheel showing, in successively more detailed fragmentary views, a mesh screen assembly and the pleated filter elements of that mesh screen assembly held between stringers.
Figure 2A:
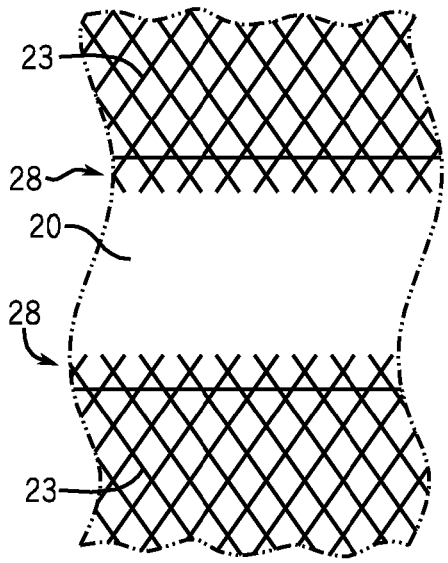
FIGS. 2a and 2b are a fragmentary phantom views of a stringer of the mesh screen assembly showing different degrees of overlap of the edges of the mesh and the stringer material that can occur because of movement of the mesh during the molding process.
Figure 2B:
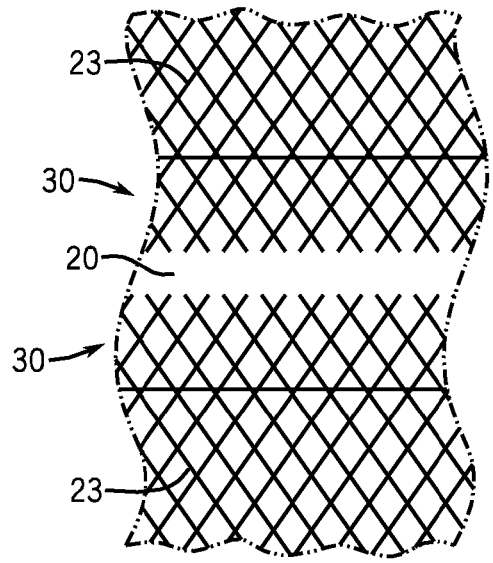

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 3:
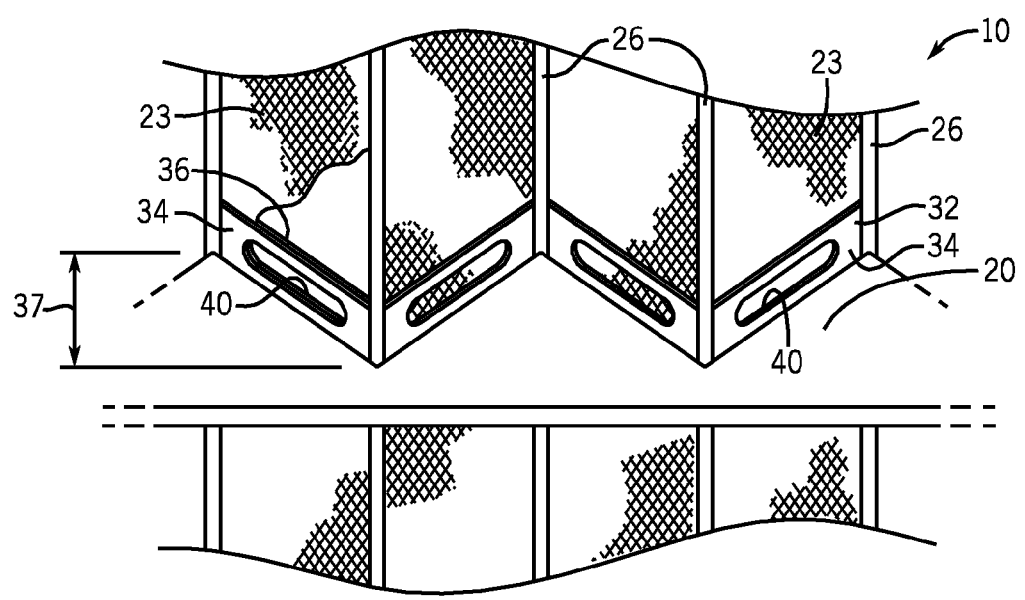
FIG. 3 is a fragmentary perspective view of mesh retention strips that follow the pleats and extend outward from the stringers capturing the mesh ends to provide for improved retention.

Referring now to FIG. 3, in the present invention, the stringers 20 include mesh retention strips 32 extending outward from the opposite broad surfaces of the stringers 20 engaging opposite sides of the end of the mesh 23 near the stringer 20. The mesh retention strips 32 follow the zigzag line of intersection of the pleated mesh 23 with the stringer 20 so that their cross-sectional height is much less than the stringer 20 and only slightly greater than the thickness of the mesh 23. The mesh retention strips 32 are divided into segments, each segment extending between a pair of ridge bars 26.

Each mesh retention strip 32 is comprised of a front portion 34 and a commensurate and substantially identical rear portion 36 sandwiching the mesh 23 there between. Whereas the stringer 20, for strength, must extend for a full height 37 of the pleats of the mesh 23, the ability of the mesh retention strip 32 to follow with the path of the pleated material allows the amount of thermoplastic material needed for the mesh retentions strips 32 to be minimized.

Referring now to FIG. 4, as noted above, one mesh retention strip 32 extends outward on the each side of the stringer 20 so that mesh retention strips 32 help join separate elements of mesh 23 from two different filter sections 21 at their point of abutment at a given stringer 20.

Figures 4A, 4B:
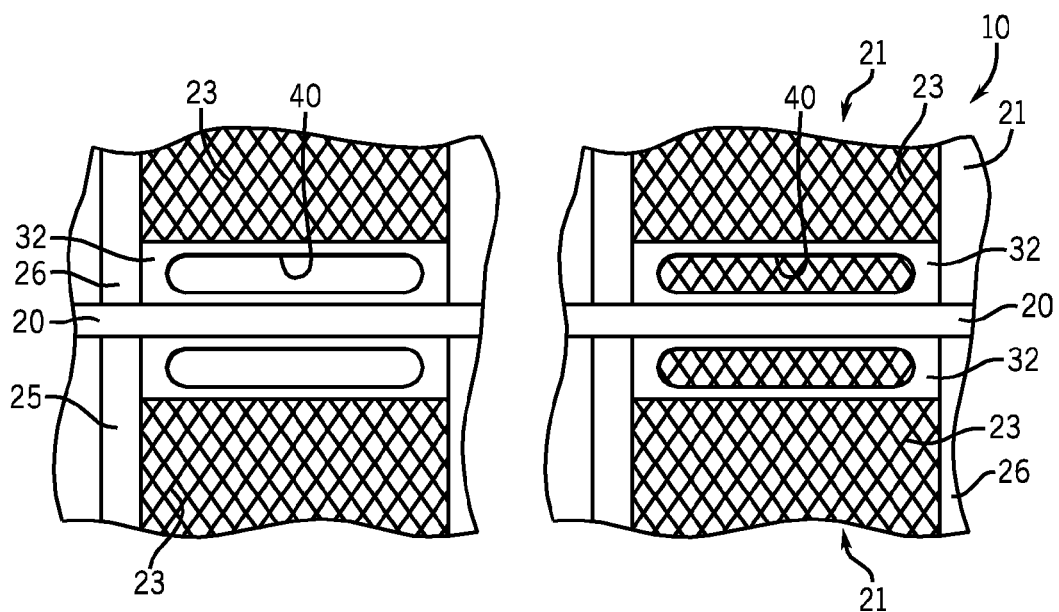
FIGS. 4a-4b are front elevational views of the mesh retention strips showing windows in the mesh retention strips that reveal the amount of engagement of the mesh 23 with the mesh retention strip.

Each mesh retention strip 32 thus provides a greater area of capture for the ends of the mesh 23 by the stringer 20. Centered within the exposed surface of each segment of mesh retention strips 32 is an aperture or window 40 that permits visual confirmation of the extent to which the mesh 23 is captured by the mesh retention strip 32. As shown in FIG. 4a, mesh 23 that is partially captured by the thermoplastic material of the mesh retention strip 32 but that provides little overlap area is visually apparent by inspection of the window 40 which is unfilled or only partially filled by the mesh 23. This is in contrast to the window 40 shown in FIG. 4b in which the mesh 23 fully fills the window 40.

Figure 5:
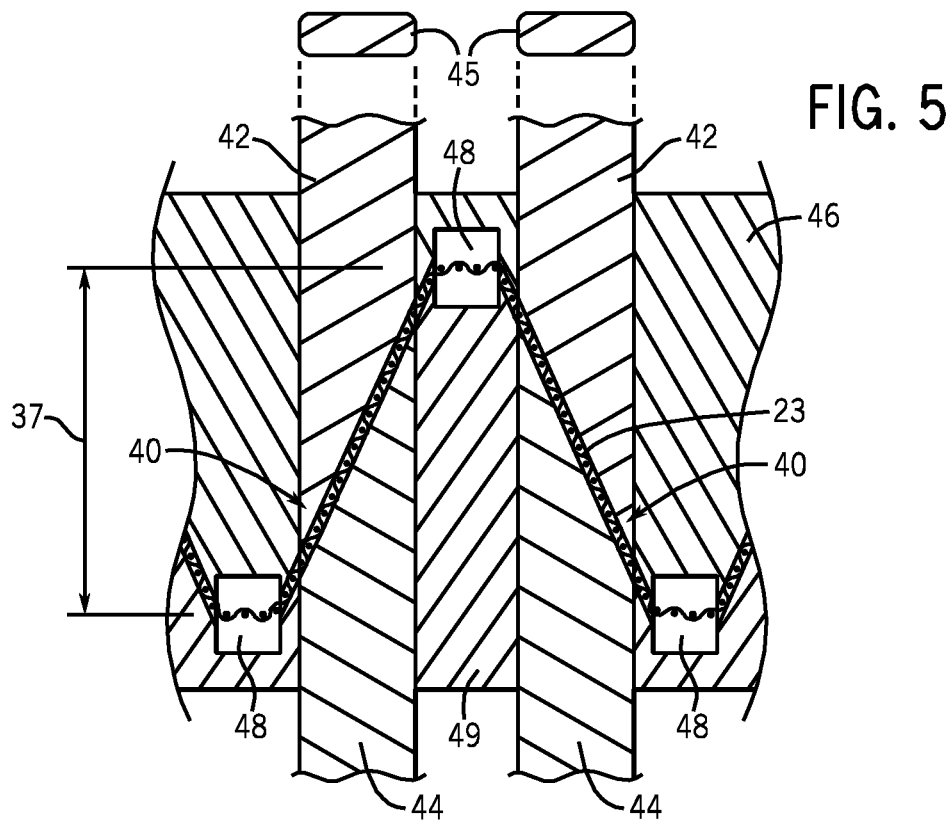
FIG. 5 is a fragmentary cross-sectional view through a mold for molding elements of the mesh screen assembly showing clamping pins engaging the mesh 23 through the windows of the mesh retention strips to provide increased clamping pressure at the ends of the pleats of the mesh to hold the mesh into engagement with the mesh retention strips.

Referring now to FIG. 5, the windows 40 provide passage during molding for mold clamp pins 42 and 44 sliding within the mold halves 46 and 49 to clamp opposite sides of the mesh 23 at the mesh retention strips 32. These pins 42 and 44 have cross-sections 45 generally corresponding to the shape of the windows 40 shown in FIG. 4. Because these pins 42 and 44 are separately movable with respect to mold halves 46 and 49 they may provide substantially greater local pressure (force per area) against the mesh 23 localized close to the stringers 20 where the mesh must be retained against movement.

Figure 6:
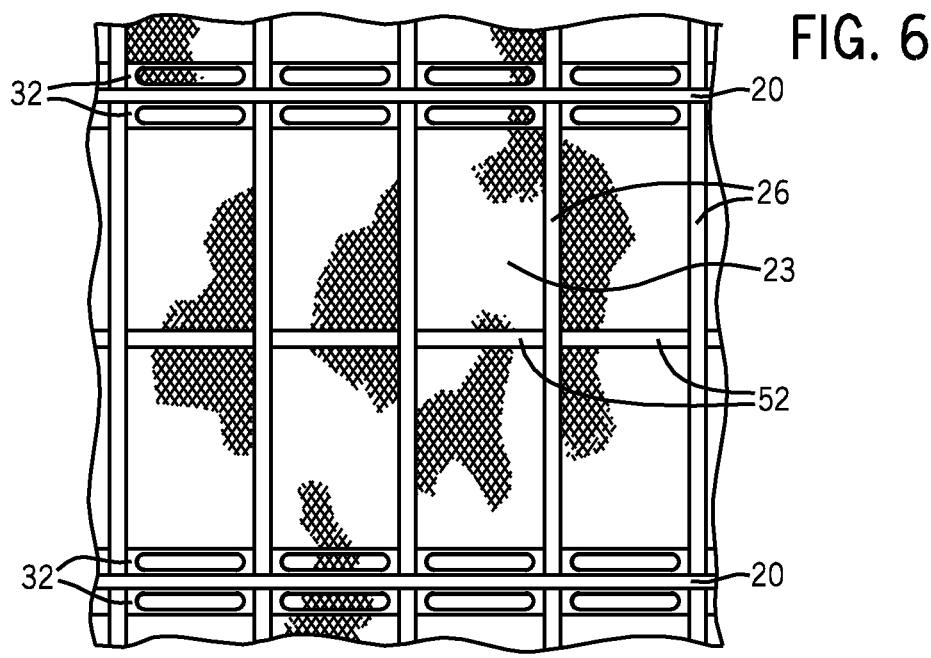
FIG. 6 is a front elevational view similar to that of FIG. 4 showing the introduction of ridge bars preventing bowing of the mesh such as can increase pullout tensions.

Referring now to FIG. 6, ribs 52 may be further molded between the ridge bars 26 approximately midway between the stringers 20 to follow the mesh 23 on both sides of the mesh 23 in the manner of the ridge bars 26 and mesh retention strips 32. By preventing bowing of the exposed mesh 23 near its center, the tension on the individual wire elements of the woven mesh 23 is decreased reducing pullout.

Generally the mold halves 46 and 49 define interconnected cavities for thermoplastic injection of the stringer 20, ribs 52 and ridge bars 26 whose cavities 48 are visible in cross-section in FIG. 5 according to methods understood in the art.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A mesh screen assembly comprising:
 a thermoplastic frame defining a filter area;
 at least two thermoplastic stringers extending across the filter area to divide the filter area into filter sections;
 at least two filter meshes extending within different filter sections between portions of the frame and opposite sides of at least one stringer, the filter meshes having opposed edges in-molded within at least one stringer;
 the stringers further including mesh retention strips extending outward from the stringers to cover opposing sides of edges of the filter meshes embedded in the stringer, the mesh retention strips including a window exposing a portion of an edge of a filter mesh indicating a depth of insertion of the filter mesh into the filter mesh retention strip.

2. The mesh screen assembly of claim 1 wherein the filter meshes are pleated along fold lines substantially perpendicular to the stringers.

3. The mesh screen assembly of claim 2 further including thermoplastic ridge bars extending along ridges of the pleats between the stringers to support the pleats.

4. The mesh screen assembly of claim 3 further including ribs having ends attached to different adjacent ridge bars and positioned between the stringers, the ribs in-molding the filter mesh.

5. The mesh screen assembly of claim 2 wherein the stringers provide planar surfaces abutting edges of the pleats over an entire edge of the pleats.

6. The mesh screen assembly of claim 1 wherein the filter mesh is a woven mesh.

7. The mesh screen assembly of claim 6 wherein the filter mesh includes at least two layers of woven mesh placed entirely one upon the other.

8. The mesh screen assembly of claim 1 wherein the frame is an isosceles trapezoid.

9. The mesh screen assembly of claim 1 wherein the frame substantially conforms to a sector of annulus so that multiple frames may be fit together to form a filter wheel.

10. A method of fabrication of a mesh screen assembly comprising the steps of:
 placing at least two filter meshes with in a mold having cavities describing a frame defining a filter area and at least two stringers extending across the filter area to divide the filter area into filter sections so that the two filter meshes extend continuously within different filter sections between portions of the frame cavity and opposite sides of at least one stringer cavity, the filter meshes having opposed edges entering at least one stringer from opposite sides; the mold cavity describing the stringer providing for a molding of mesh retention strips extending outward from the stringers to cover opposing sides of edges of the filter meshes embedded in the stringer, the mesh retention strips including a window exposing a portion of an edge of a filter mesh indicating a depth of insertion of the filter mesh into the filter mesh retention strip;
 clamping the filter meshes by clamps independently movable with respect to the mold and engaging the filter meshes through the window portion of the stringer cavity; and
 injecting thermoplastic within the mold cavity to fill the frame and stringers thereby in-molding edges of the filter meshes.

11. The method of claim 10 wherein the filter meshes are pleated along fold lines substantially perpendicular to the stringer cavities and wherein the mold further includes cavities providing thermoplastic ridge bars extending along ridges of the pleats above and below the ridges between the stringers to support the pleats.

12. The method of claim 11 wherein the mold further includes cavities providing ribs having ends attached to different adjacent ridge bars and positioned between the stringers.

13. The method of claim 10 wherein the stringer cavities provide planar surfaces proximate to edges of the pleats over entire edge of the pleats.

14. The method of claim 10 wherein the filter mesh is a woven mesh.

15. The method of claim 14 wherein the filter mesh includes at least two layers of woven mesh placed entirely one upon the other.

16. The method of claim 10 further including the step of fitting multiple frames together to form a filter wheel.

* * * * *